United States Patent [19]

Adelman

[11] 4,321,297
[45] Mar. 23, 1982

[54] SHEET PACKAGING MATERIAL

[75] Inventor: Herbert B. Adelman, Wilmington, Del.

[73] Assignee: The Crowell Corporation, Newport, Del.

[21] Appl. No.: 246,372

[22] Filed: Mar. 23, 1981

Related U.S. Application Data

[63] Continuation-in-part of Ser. No. 166,079, Jul. 7, 1980, Pat. No. 4,263,360.

[51] Int. Cl.³ .......................... B32B 7/00; B32B 9/00
[52] U.S. Cl. .................................... 428/238; 428/332; 428/305.5; 428/314.4; 428/315.9; 428/314.8; 428/315.7; 428/317.1
[58] Field of Search ............... 428/310, 311, 313, 315, 428/317, 318, 332, 238

[56] References Cited

U.S. PATENT DOCUMENTS 2,829,080  4/1958  Fessler et al. ...................... 428/483
3,080,211  3/1963  Fessler et al. ...................... 428/480
4,086,384  4/1978  Adelman et al. .................. 428/310
4,263,360  4/1981  Adelman ............................ 428/315
4,275,835  6/1981  Miksic et al. ...................... 428/311

*Primary Examiner*—William J. Van Balen
*Attorney, Agent, or Firm*—Connolly and Hutz

[57] ABSTRACT

A padded packaging sheet for guarding against rust and corrosion, incorporates a coating of volatile corrosion inhibitor (VCI) on a pliable layer of a sealed cell microporous foam. The VCI can be incorporated in a cohesive non-adhesive coating on the micro-porous layer or directly on the micro-porous layer in the absence of such cohesive coating. The effectiveness of the VCI can be further enhanced by incorporating in the padded sheet a vapor barrier such as for example, aluminum foil or a film of hydrophobic polymer such as a silicone or a polyester such as Mylar (polyethylene terephthalate). A water-repellent layer can also be added. The sheet can be made anti-static and/or opaque, and strengthened with fibers that make it almost impossible to tear.

14 Claims, 3 Drawing Figures

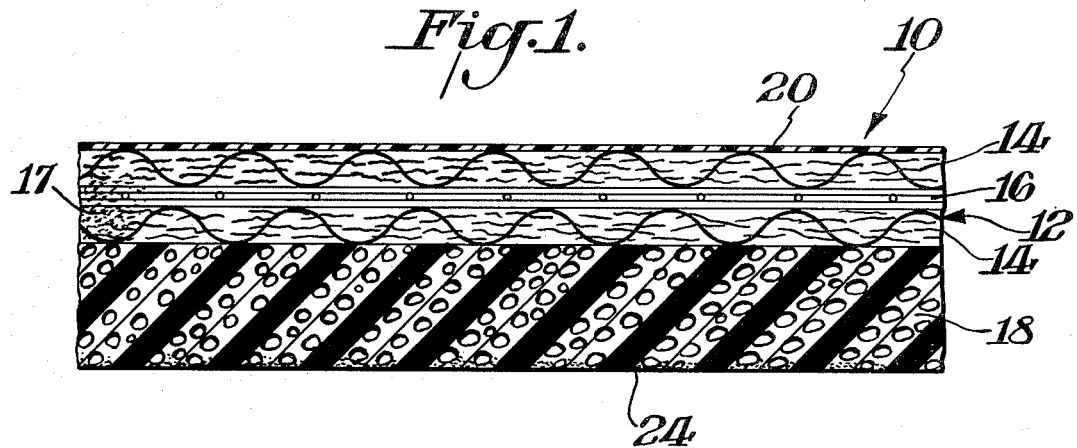
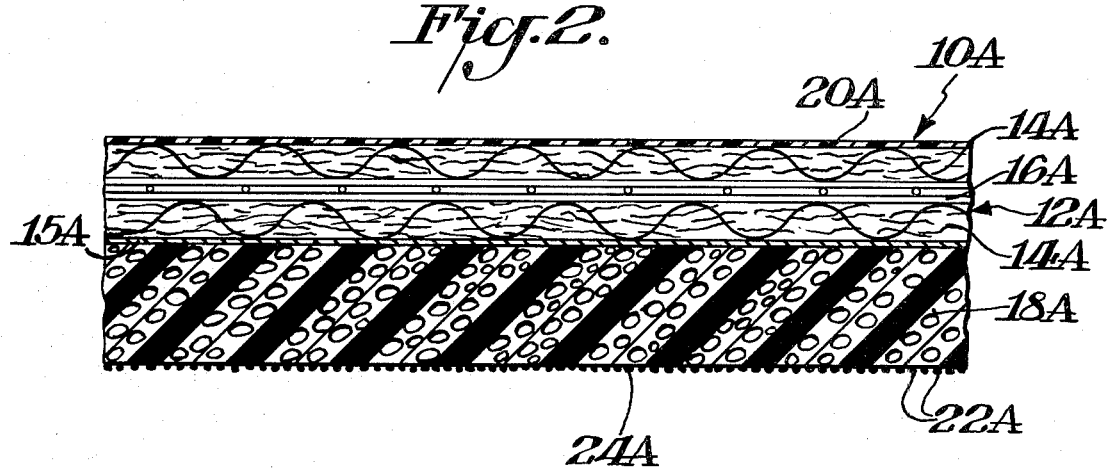
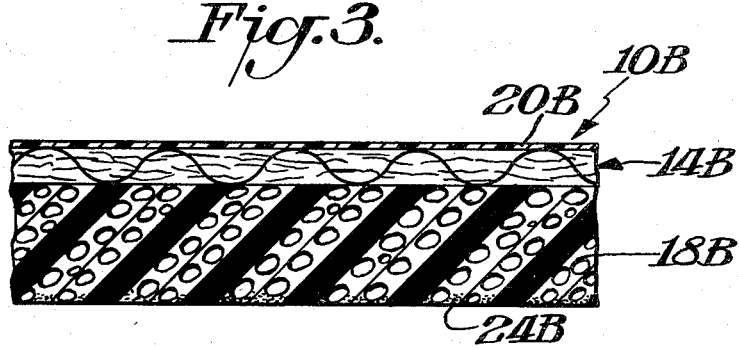

SHEET PACKAGING MATERIAL

This application is in part a continuation of application Ser. No. 166,079 filed July 7, 1980, (U.S. Pat. No. 4,263,360 granted Apr. 21, 1981) the contents of which are hereby incorporated as though fully set forth.

U.S. Pat. No. 4,086,384 describes a highly useful laminated paper-sheet packaging material in which a layer of a pliable sealed cell micro-porous foam is adhered to a layer of kraft paper, which may be reinforced by fiberglass strands. Such material is very effective for wrapping around objects to make a package, but may not sufficiently protect over extended periods of time such highly moisture-sensitive objects as; tin plate, steel, copper, aluminum alloys, cadmium, stainless steel, goldplates and other corrodible metals or materials which are subject to corrosion when stored for extended periods under ordinary atmospheric conditions. Volatile corrosion inhibitors consist of a group of rust-inhibiting chemical composition such as those referred to in U.S. Pat. Nos. 2,829,080 and 3,080,211 which are designed to protect various types or grades of metals for short and long-term storage. VCI's have previously been applied to sheets used for packaging, wrapping or interleaving or in the form of separate insert sheets packaged with metals.

Among the objects of the present invention is the provision of improved laminated sheet material for packaging water-vapor-sensitive materials, particularly metals, and preventing them from rusting, corroding or other deterioration over extended periods of storage.

Additional objects of the present invention include improved packaging material for other types of sensitive products.

According to the present invention, a padded sheet for packaging a moisture-sensitive material has a layer of paper which is adhered to one face of a pliable layer of a sealed-cell microporous foam, and a VCI-containing layer is adhered to the opposite face of the polymer layer. Another substrate such as aluminum foil or polyester film may be included in the sheet to provide an extremely effective vapor barrier and help contain the volatile corrosion inhibiting chemicals, thus extending the effectiveness of the VCI for a longer period of time. The paper may be reinforced with strands of fiberglass to strengthen it. Reinforcement may also be accomplished by adhering other types of mesh such as polypropylene mesh to the laminate.

Other improved packaging sheets of the present invention contain anti-static material or light-blocking material.

Novel features and advantages of the present invention will become apparent to one skilled in the art from a reading of the following description in conjunction with the accompanying drawings wherein similar reference characters refer to similar parts and in which:

FIG. 1 is a cross-sectional view in elevation of a laminated sheet material which is one embodiment of this invention;

FIG. 2 is another cross-sectional view in elevation of another laminated sheet material which is another embodiment of this invention; and FIG. 3 is a further cross-sectional view in elevation of a further laminated sheet material which is a further embodiment of this invention.

In FIG. 1 is shown a laminated sheet material 10 for packaging or wrapping water-vapor-sensitive material, such as various metals including steel, wrought iron, copper, cast iron, aluminum, aluminum alloys, zinc, magnesium alloys, brass, cadmium, silver, copper and nickel alloys, stainless steel, goldplate and galvanized and aluminized steel. Such metals are highly subject to corrosion from ambient water vapor, especially over extended storage.

Sheet 10 includes a layer of paper material 12 which has two piles 14, 14 of kraft paper reinforced by strands of fiberglass 16. Kraft paper plies 14 are each, for example, fifty-pound kraft paper. Other useful types of kraft paper are, for example, thirty-pound, sixty-pound, or ninety-pound, or even forty-two-pound liner board. Fiberglass strands 16 arranged, for example in a diamond pattern, with or without longitudinal strands, are interspersed between paper plies 14. Plies 14 are adhered to each other and to the interspersed fiberglass in a diamond pattern, with or without longitudinal strands, and sealed overall by adhesive 17 which is, for example, of the hot melt type, such as amorphous polypropylene. The ultimately laminated sheet 10 has remarkable strength to weight ratio and is extremely useful for wrapping and packaging where substantial tear strength is required.

The paper layers are adhered to a bottom-layer 18 which is a pliable sealed cell micro-porous polymer and may, for example, be from about 1/32 inch to ⅛ inch thick. A highly effective sealed cell micro-porous foam polymer is described in U.S. Pat. No. 4,086,384, is made from polypropylene resin, and constitutes a high-bulk material with approximately fifty thousand closed air cushion cells per cubic inch. Foam polymer layer 18 can be adhered to the paper by the same hot melt adhesive used to adhere together the kraft paper plies 14, 14.

As described in the parent application, layer 20 of a water-repellent polymer, such as polyethylene, may be disposed over the top of two-ply kraft paper layer 12, but it is not needed where the packaging sheet and the package made with it, are not exposed to liquid water. Polymer coating 20 may be colored or printed to distinguish it and to control the passage of light through it. Other water-repellent polymers, such as polyvinyl chloride, polypropylene, polycarbonates or polyethylene terephthalate can be used in place of the polyethylene, and layer 20 need only be about 25 microns thick.

A suitable VCI 24 is disposed upon the micro-porous polymer layer 18 as by evaporation of the solvent from a VCI solution coated over that layer. The yieldability and stretchability of the foam brings the VCI on its surface into very effective content with the surface of an object wrapped in the packaging sheet, particularly when such object is of irregular shape.

FIG. 2 shows another laminate 10A of this invention, having the basic construction of laminate 10, but with a layer 22A of cohesive material applied to the outer surface of microporous foam layer 18A. Cohesive layer 22A, is for example, a latex material having the property, after it is applied and dried, of staying in place and sticking to itself but not adhering to other materials such as other portions of the sheet. This cohesiveness facilitates securing sheet 10A about an object wrapped within it as explained in U.S. Pat. No. 4,086,384. Although it is nonadherent to objects other than itself, it will help hold the sheet wherever the sheet is placed, providing extremely high frictional resistance, and is somewhat rubbery to the touch. The packaging sheet, therefore, does not slide off an object on which it is placed, and touching two sheet portions together to bring their cohesive layers into contact with each other causes these layers to stick together, thus facilitating the enfolding and sealing process. The VCI is conveniently incorporated in the cohesive material as by dissolving the VCI in the latex from which the cohesive layer is formed.

Another substrate such as aluminum foil or polyester film 15A can be inserted as a vapor barrier to help contain the volatile VCI chemicals thus extending their effectiveness. An aluminum foil 0.0008 inch thick is very effective for this purpose. The construction is such that the vapor barrier 15A is sandwiched between micro-porous layer 18A and the paper backing 14A.

For example, a paper backing of 30# kraft when used with 0.0008 inch foil and 1/16 inch micro-porous layer and tested in accordance with Federal Standard 101-B, Method 3030, Procedure B, showed an MTVR (moisture vapor transmission rate) of 0.02 g/100 in. 2/24 Hr. With this value, the product fully complies with the moisture vapor transmission requirements of Military Specification MTL B-131-F. Its puncture resistance is also much greater than a corresponding packaging sheet that did not include the foam layer.

FIG. 3 shows a further laminated sheet 10B which is the same as sheet 10 in FIG. 1, except that a single ply 14B of kraft paper of, for example sixty pound weight, it utilized instead of the reinforced two-ply kraft paper layer 12 of FIG. 1. Sheet 10B can be used when the extremely great tear strength of sheet 10 is not required. A suitable VCI 24B is dispersed upon the outer face of micro-porous foam layer 18B. The VCI coating may also be incorporated in a cohesive layer (not shown), which may be deposited on micro-porous layer 18B. A water-repellent coating 20B is shown on the outer surface of the paper layer 14B and an aluminum foil or polyester film may also be inserted between kraft paper layer 14B and micro-porous foam layer 18B in addition to or instead of coating 20B. Reinforcing strands such as of fiberglass may also be laminated between the paper and the microfoam.

The packaging sheets of this invention have excellent versatility and performance, particularly for the special problems of metals packaging. Their performance is greatly upgraded by the intimate contact of the micro-porous foam with the metal (not shown) wrapped in the sheets. Such micro-porous foam material made of polypropylene complies with F.D.A. regulations, which permit it to be safely used as an article or a component of an article intended for use in contact with food. It is unaffected by exposure to grease, water and most acids, bases and solvents. It stays flexible within a wide temperature range, has neutral pH, is non-toxic, non-corrosive, lint-free, has excellent abrasion resistance and will not support the growth of mildew or fungus. It also has an excellent clean-white appearance which is highly desirable for packaging of many materials.

A VCI coating weight of only about 0.004 grams per square foot of foam surface is generally all that is needed, but weights of 0.01 or even 0.02 grams per square foot can be used if desired. Water-soluble VCI's are preferable deposited from water solution, and water-insoluble VCI's from solution in a solvent like methyl chloroform. When a water-soluble VCI is mixed with a rubber latex, care should be taken to keep the latex emulsion from breaking into two layers before the mixture is applied to the foam surface.

Some water-sensitive metals are deliberately coated with a film of water-repellent oil to help prevent corrosion. When packaging such coated metals it is helpful to use a packaging laminate in which the plies are bonded together with an oil-resistant laminant or bonding adhesive such as rubber latex or polyvinyl acetate or highly polymerized polyvinyl chloride. Amorphous polypropylene melt polymer can be dissolved by some coating oils to the extent that delamination and great loss of strength can occur.

The VCI's are generally more volatile than they need to be, and can be mixed with other chemicals such as fatty alcohol phosphates, which are less volatile or non-volatile. Such mixtures will also protect metals against corrosion. In fact, fatty alcohol phosphates also have a corrosion-inhibiting effect on iron and other metals. The Zelec NE and Zelec NH fatty alcohol phosphate anti-static agents sold by E.I. duPont de Nemours & Co., as well as di-[2-ethyl-hexyl]-hydrogen phosphate and the morpholine salt of di-[9-octadecenyl]-hydrogen phosphate make good corrosion inhibitors and are also very effective anti-static agents whether or not mixed with a VCI. Where the VCI is not sufficiently soluble in water, the addition of a fatty alcohol phosphate anti-static agent will help disperse the VCI in water, inasmuch as the anti-static agent also has surfactant properties. Anionic surfactants such as those phosphates should not be mixed with a cationic latex, nor should a cationic surfactant be used with an anionic latex, unless the proportion of surfactant is too small or too large to break the latex emulsion, or a stabilizer is added. Polyacrylic acid having a molecular weight of about 3000 to about 20,000 makes a good stabilizer, as does gelatine and surfactants.

A very useful packaging sheet is thus obtained with the laminated construction of FIG. 1, by applying as the layer 24 a 5% dispersion of morpholine caprylate in water, and then permitting the solvent to evaporate. A single application is generally enough to provide the desired amount of VCI, and the closed-cell character of the foam layer 18, keeps the VCI on the outer face of the foam, even when that foam layer is only 1/16 inch thick or less. Such a thin foam layer, with reinforced or un-reinforced paper plies each of 50-pound kraft paper, makes a good corrosion-resistant sheet for wrapping or interleaving with steel sheets.

A layer of natural rubber latex can then be applied over the VCI layer, or if desired the rubber latex is mixed with the VCI dispersion before that dispersion is applied. The amount of rubber remaining on the outer face of the foam should be enough to provide the cohesive non-adhesive character, generally at least about 0.05 gram per square foot.

Alternatively the VCI coating can be the only coating on the exposed surface of the foam, with the latex coating applied to the paper surface on the opposite face of the laminated assembly.

Before anything is applied to the foam surface it can first be coated with about 0.01 gram per square foot of anti-static layer such as the morpholine salt of di-[9-octadecenyl]-hydrogen phosphate or one of the above-noted Zelec products, although such a coating can be applied after the VCI coating, or after the cohesive non-adhesive coating. An anti-static agent that is not oily is desired when used with the cohesive non-adhesive coating, inasmuch as oily films detract from the cohesion otherwise obtainable.

Ordinary kraft paper when used in weights as high as 90 pounds or even higher, is not perfectly opaque. For use in packaging light-sensitive material such as unexposed microfilm, a single opaque paper ply laminated to the micro-porous closed-cell foam can be used, as for example when the paper is a fifty-pound sheet beater-dyed with Basic Violet No. 3 or Pigment Black No. 7, to a dye content of about ½% by weight. Where two paper plies are present in the laminated assembly, either one, or both can be dyed, and when both are dyed their dye content can be lower and as little as ¼% by weight. However lighter sheets should contain proportionately more dye. Carbon black can also be incorporated in the papers instead of or together with one or more dyes.

Aluminum foil that is extremely thin, e.g. 0.5 to 0.8 mil, is also opaque and can be laminated in the assembly as in FIG. 2, but such thin foil usually contains pin-holes that admit light. It is accordingly best not to rely on such thin foils for all but the least sensitive of articles. Carbon black can likewise be incorporated in the foam, as by forming carbon-loaded resin, and will impart anti-static properties in addition to opaqueness.

For wrapping light-sensitive material, the opaque wrapping sheet preferably carries the cohesive non-adhesive coating, but does not need the VCI unless the light-sensitive material is packaged with corrodible metal. The cohesive non-adhesive coating, or the foam surface under it, can also contain the anti-static agent inasmuch as the pulling apart of a cohesively secured wrapper can otherwise generate sufficient static electricity to cause luminous discharges that fog very sensitive photographic emulsions.

The wrapping sheets of the present invention can be used for any wrapping or interleaving application. The cohesive non-adhesive layer makes these sheets particularly desirable inasmuch as such sheets are readily secured to each other without the need for hold-downs such as baling straps or twine.

Thus the trunk of a tree is readily protected by wrapping using a sheet that is longer than the tree circumference. The sheet is wrapped completely around the trunk to leave a projecting end at each end of the sheet, and these projecting ends then pressed together to bring their respective cohesive non-adhesive layers in contact with each other. This causes those ends to become adhered to each other and thus securely retains the sheet in place. One sheet can have a width as large as the trunk height desired to be wrapped, or two or more sheets wrapped beside each other to cover th desired height.

The foam surfaces of the wrapping sheet are sufficiently yieldable to permit the sheets to be drawn up tightly against the trunk by the wrapping, without causing any trunk irregularity to puncture the wrap.

It appears that a wrap of the above type will not only protect the trunk from abrasion and the like, as for example when a package of trees is shipped by truck, but it also keeps hungry animals from eating the bark.

The cohesive non-adhesive paper-foam laminated sheets also make very good bases on which to place objects that are to be held in position. Thus a carton of labelled bottles can be packed without the usual separator grid when the bottles are placed on the cohesive non-adhesive coated foam surface of a packaging sheet. Such packing keeps the bottles from rubbing or vibrating against each other when subjected to the usual shipping conditions, and the labels on the bottles will not become damaged or blurred.

For this purpose the sheet can have a single paper ply of as little as 20 pounds weight, and the foam thickness need be no greater than 1/16 inch. Reducing that foam thickness or eliminating the foam altogether and having the cohesive non-adhesive layer only on a sheet of paper, gives poorer results.

The cohesive non-adhesive coatings also permit the sheets to be sandwiched together around any object to be wrapped, by having the sheets project in at least two directions beyond the object. Thus a text book is very simply sandwiched to make a complete book-mailing package that only needs an address label, with the sheets projecting only about 1½ to 3 inches beyond the book at each edge.

Even liquids can be similarly packaged, as by folding a sheet in two to bring the cohesive non-adhesive faces of the folds toward each other and pressing the facing side margins together to make a pocket. The liquid to be packed is poured into the pocket after which the top of the pocket is sealed pressing the folds together in that location. The closed-cell nature of the foam will not permit leakage of the liquid.

While paper sheets are quite suitable for the plies 14, 14 or 14A, 14A or 14B, these plies can be made of woven or knitted textile fibers, or of air-filtered textile fibers, or even of plastic film. A strong plastic such as polyethylene terephthalate is preferred for such film or for the fibers. Instead of the usual type of plastic fibers, narrow widths of plastic film can be woven to make one or both of the plies. When a ply is made of strong material such as the polyethylene terephthalate, it makes a very effective reinforcement for a paper ply whether such reinforcement be an outer layer of the packaging sheet or a layer between the foam layer 18 and the adjacent ply 14. Having a relatively smooth surface on one face of the packaging sheet is desirable because such a surface can be printed with advertising or the like.

The use of even two paper plies without any reinforcement is not as desirable as having one ply of paper together with a high-strength reinforcement. Glass fibers or nylon or qiana fibers are very effective and glass is particularly desirable by reason of its low cost. An un-reinforced paper-foam packing sheet is only suitable for very light duty use, whereas a well-reinforced packing sheet is almost impossible to tear. This is of major importance when packaging or padding metals.

Obviously many modifications and variations of the present invention are possible in the light of the above teachings. It is, therefore, to be understood that within the scope of the appended claims the invention may be practiced otherwise than as specifically described.

What is claimed:

1. A laminated sheet for wrapping around corrodible material, the sheet having a paper layer, a layer of pliable sealed cell micro-porous foam, adhesive material securely bonding the micro-porous foam and paper layers together, and a layer of volatile corrosion inhibitor on the surface of the foam remote from the paper layer, to inhibit corrosion of the wrapped material.

2. A laminated sheet as set forth in claim 1, and further containing a water-repellant stratum.

3. A laminated sheet as set forth in claim 1, and further containing a vapor barrier stratum.

4. A laminated sheet as set forth in claim 1, wherein the layer of paper has reinforcing fibers attached thereto.

5. A laminated sheet as set forth in claim 4, wherein the reinforcing fibers are fiberglass strands.

6. A laminated sheet as set forth in claim 5, wherein the fiberglass fibers are sandwiched between two plies of paper.

7. A laminated sheet as set forth in claim 1, wherein the volatile corrosion inhibitor layer is in a cohesive non-adhesive coating that will adhere to itself but not to other parts of the sheet.

8. A laminated sheet as set forth in claim 1, wherein the foam is a polypropylene foam.

9. A laminated sheet as set forth in claim 1, wherein the paper has two plies of fifty pound kraft paper each.

10. A laminated sheet as set forth in claim 1, wherein the micro-porous foam layer ranges approximately from 1/32 inch to ⅛ inch thick.

11. A laminated sheet as set forth in claim 3, wherein the vapor barrier is a film of polyethylene terephthalate.

12. A laminated sheet material as set forth in claim 1, wherein its layer are adhered together by a hot melt adhesive.

13. A laminated sheet as set forth in claim 3, wherein the vapor barrier is an aluminum foil.

14. A laminated sheet as set forth in claim 1 in which the adhesive material is an oil-resistant bonding agent.

* * * * *

UNITED STATES PATENT AND TRADEMARK OFFICE
CERTIFICATE OF CORRECTION

PATENT NO. : 4,321,297
DATED : March 23, 1982
INVENTOR(S) : Herbert B. Adelman

It is certified that error appears in the above–identified patent and that said Letters Patent are hereby corrected as shown below:

Column 2, line 9 "piles" should be --plies--;

line 57, "22A, is" should be --22A is,--;

Column 3, line 21, "MTL" should be --MIL--;

line 61, "preferable" should be --preferably--;

Column 5, line 46, correct spelling of "the"; and

Column 6, line 22, "filtered" should be --felted--.

Signed and Sealed this

Seventeenth Day of August 1982

[SEAL]

Attest:

Attesting Officer

GERALD J. MOSSINGHOFF
*Commissioner of Patents and Trademarks*